United States Patent
Schober et al.

(10) Patent No.: US 12,137,446 B2
(45) Date of Patent: Nov. 5, 2024

(54) INTERFERENCE HANDLING IN TELECOMMUNICATION SYSTEMS

(71) Applicant: NOKIA TECHNOLOGIES OY, Espoo (FI)

(72) Inventors: Karol Schober, Helsinki (FI); Zexian Li, Espoo (FI); Ling Yu, Kauniainen (FI); Antti-Veikko Sakari Piipponen, Helsinki (FI)

(73) Assignee: NOKIA TECHNOLOGIES OY, Espoo (FI)

(*) Notice: Subject to any disclaimer, the term of this patent is extended or adjusted under 35 U.S.C. 154(b) by 350 days.

(21) Appl. No.: 17/759,583

(22) PCT Filed: Dec. 18, 2020

(86) PCT No.: PCT/EP2020/087241
§ 371 (c)(1),
(2) Date: Jul. 27, 2022

(87) PCT Pub. No.: WO2021/155988
PCT Pub. Date: Aug. 12, 2021

(65) Prior Publication Data
US 2023/0085934 A1    Mar. 23, 2023

(30) Foreign Application Priority Data
Feb. 5, 2020   (FI) .................................... 20205119

(51) Int. Cl.
*H04W 72/12*   (2023.01)
*H04L 5/14*    (2006.01)

(52) U.S. Cl.
CPC ............ *H04W 72/12* (2013.01); *H04L 5/14* (2013.01)

(58) Field of Classification Search
None
See application file for complete search history.

(56) References Cited

U.S. PATENT DOCUMENTS

2017/0034790 A1   2/2017   Lopez-Perez et al.
2017/0257184 A1   9/2017   Stirling-gallacher et al.
(Continued)

FOREIGN PATENT DOCUMENTS

CN   106063178 A   10/2016
CN   108024363 A   5/2018
(Continued)

OTHER PUBLICATIONS

Translation of WO2022151782 (Year: 2022).*
"New SI proposal: Study on flexible and full duplex for NR", 3GPP TSG RAN Meeting #78, RP-172737, Agenda Item: 9.1.1, LG Electronics, Dec. 18-21, 2017, 5 pages.
(Continued)

*Primary Examiner* — Robert M Morlan
(74) *Attorney, Agent, or Firm* — Lippes Mathias LLP

(57) ABSTRACT

There is provided an apparatus comprising means for receiving, from a full-duplex network node, at least one message comprising at least primary scheduling information comprising at least a primary resource allocation for uplink data transmission, wherein a configuration related to the primary resource allocation indicates that the primary resource allocation is adjustable; sensing reservation signals on a physical resource block group basis, the sensing comprising determining one or more contiguous sets of physical resource block groups on which the apparatus is allowed to transmit; adjusting the primary resource allocation to correspond to at least a subset of the one or more contiguous sets of PRB groups to obtain an adjusted resource allocation; and transmitting, to the full-duplex network node, an adjustment indication on uplink control channel resource corresponding to the primary resource allocation, wherein the uplink control channel resource is received in the at least one message or is pre-configured.

20 Claims, 6 Drawing Sheets

(56) References Cited

U.S. PATENT DOCUMENTS

| | | | |
|---|---|---|---|
| 2018/0035455 A1* | 2/2018 | Xu | H04W 72/23 |
| 2018/0098223 A1 | 4/2018 | Hugl et al. | |
| 2018/0124718 A1 | 5/2018 | Ng et al. | |
| 2018/0206127 A1 | 7/2018 | Zhang et al. | |
| 2018/0324788 A1 | 11/2018 | Choi et al. | |
| 2018/0343047 A1 | 11/2018 | He et al. | |
| 2019/0190668 A1 | 6/2019 | Lei et al. | |
| 2019/0208540 A1 | 7/2019 | Kim et al. | |
| 2019/0223108 A1 | 7/2019 | Wang et al. | |
| 2019/0364449 A1 | 11/2019 | Yang et al. | |
| 2021/0360575 A1* | 11/2021 | Abotabl | H04W 52/367 |

FOREIGN PATENT DOCUMENTS

| | | | |
|---|---|---|---|
| CN | 108289311 A | 7/2018 | |
| CN | 108738135 A | 11/2018 | |
| CN | 108781455 A | 11/2018 | |
| CN | 110035548 A | 7/2019 | |
| CN | 110754133 A | 2/2020 | |
| EP | 3297186 A1 | 3/2018 | |
| EP | 3506687 A1 | 7/2019 | |
| WO | 2015/062528 A1 | 5/2015 | |
| WO | 2017/133780 A1 | 8/2017 | |
| WO | 2018/070776 A1 | 4/2018 | |
| WO | 2019/190994 A1 | 10/2019 | |
| WO | 2020/249229 A1 | 12/2020 | |
| WO | WO-2022151782 A1 * | 7/2022 | H04L 1/16 |

OTHER PUBLICATIONS

"3rd Generation Partnership Project; Technical Specification Group Radio Access Network; NR; Physical layer procedures for data (Release 15)", 3GPP TS 38.214, V15.6.0, Jun. 2019, pp. 1-105.

"5G; NR; Physical layer procedures for control (3GPP TS 38.213 version 15.5.0 Release 15)", ETSI TS 138 213, V15.5.0, May 2019, 106 pages.

Office Action received for corresponding Finnish U.S. Appl. No. 20205119, dated Sep. 17, 2020, 7 pages.

Office Action received for corresponding Chinese Patent Application No. 202080095671.4, dated May 24, 2024, 7 pages of Office Action and no page of translation available.

Xiaorong et al., "Interference alignment scheme for multi-cell full-duplex MIMO systems", Systems Engineering and Electronics, vol. 40, No. 7, Jun. 28, 2018, pp. 1615-1625.

International Search Report and Written Opinion for International Application No. PCT/EP2020/087241, mailed on May 19, 2021, 12 pages.

3GPP TSG RAN WG1#88bis; R1-1705790; "Interference Aware Interference Mitigation Concepts"; Agenda item: 8.1.6.1; Source: Nokia, Alcatel-Lucent Shanghai Bell; Apr. 3-7, 2017; 3 pages.

3GPP TSG RAN WG1 Meeting #89; R1-1707203; "Overview of Duplexing and Interference and Interference Management"; Source: ZTE; Agenda Item: 7.1.6; May 15-19, 2017; 10 pages.

Office Action for India Application No. 202247049381, mailed on Sep. 13, 2022, 7 pages.

* cited by examiner

INTERFERENCE HANDLING IN TELECOMMUNICATION SYSTEMS

CROSS-REFERENCE TO RELATED APPLICATIONS

This application is a national stage entry of International Application No. PCT/EP2020/087241, filed Dec. 18, 2020, entitled "INTERFERENCE HANDLING IN TELECOMMUNICATION SYSTEMS" which claims the benefit of priority of Finnish Application No. FI 20205119, filed Feb. 5, 2020, both of which are hereby incorporated by reference in their entireties.

FIELD

Various example embodiments relate to interference handling in telecommunication systems by adjusting granted resources.

BACKGROUND

A communication system may be seen as a facility that enables communication sessions between two or more entities such as communication devices, base stations/access points and/or other nodes by providing carriers between the various entities involved in the communications path. Full duplex communication allows simultaneous uplink and downlink transmission on the same resource. Sharing the same resource involves interference of transmitted signal over received signal.

Thus, there is a need for improved interference handling.

SUMMARY

According to some aspects, there is provided the subject-matter of the independent claims. Some example embodiments are defined in the dependent claims. The scope of protection sought for various example embodiments is set out by the independent claims. The embodiments, examples and features, if any, described in this specification that do not fall under the scope of the independent claims are to be interpreted as examples useful for understanding various example embodiments.

According to a first aspect, there is provided an apparatus comprising means for: receiving, from a full-duplex network node, at least one message comprising at least primary scheduling information comprising at least a primary resource allocation for uplink data transmission, wherein a configuration related to the primary resource allocation indicates that the primary resource allocation is adjustable; sensing reservation signals on a physical resource block group basis, the sensing comprising determining one or more contiguous sets of physical resource block groups on which the apparatus is allowed to transmit; adjusting the primary resource allocation to correspond to at least a subset of the one or more contiguous sets of PRB groups to obtain an adjusted resource allocation; and transmitting, to the full-duplex network node, an adjustment indication on uplink control channel resource corresponding to the primary resource allocation, wherein the uplink control channel resource is received in the at least one message or is pre-configured.

According to an example embodiment, the configuration comprises at least one or more of: a one bit indication to indicate whether the primary resource allocation is adjustable or not; secondary scheduling information comprising at least one or more of allocation adjustment indication for the uplink data transmission; a secondary resource allocation which is reduced in comparison with the primary resource allocation.

According to an example embodiment, the determining the one or more contiguous set of physical resource block groups on which the apparatus is allowed to transmit is performed based on a priority level of uplink scheduling assignment of the apparatus and/or based on an energy threshold of a signal transmitted by another device.

According to an example embodiment, the adjustment indication comprises at least one or more of: a one-bit indication to indicate whether the primary resource allocation is adjusted or not; indication of selection of secondary scheduling information, wherein the secondary scheduling information has been received and comprises at least a secondary resource allocation which is reduced in comparison with the primary resource allocation; indication of the adjusted resource allocation corresponding to at least the subset of the one or more contiguous set of PRB groups.

According to an example embodiment, the primary scheduling information further comprises modulation coding scheme to be used in case the primary resource allocation is adjusted.

According to an example embodiment, the apparatus further comprises means for shifting front-loaded demodulation reference signals (DMRS) within the adjusted resource corresponding to the adjusted resource allocation.

According to an example embodiment, the apparatus further comprises means for transmitting uplink data on the adjusted resource corresponding to the adjusted resource allocation.

According to an example embodiment, the adjusting the primary resource allocation further comprises rate-matching transport block prepared based on the primary resource allocation to the adjusted resource corresponding to the adjusted resource allocation and adjusting transmission power; or preparing a new transport block and a buffer status report based on the adjusted resource allocation.

According to an example embodiment, the apparatus further comprises means for receiving, from the full-duplex network node, a second message comprising further scheduling information for sending leftover data.

According to a second aspect, there is provided an apparatus comprising means for: transmitting in a full-duplex mode, to a user equipment, at least one message comprising at least primary scheduling information comprising at least a primary resource allocation for uplink data transmission, wherein a configuration related to the primary resource allocation indicates to the user equipment that the primary resource allocation is adjustable; receiving an adjustment indication on uplink control channel resource corresponding to the primary resource allocation, wherein the uplink control channel resource is transmitted in the at least one message or is pre-configured.

According to an example embodiment, the configuration comprises at least one or more of: a one bit indication to indicate whether the primary resource allocation is adjustable or not; secondary scheduling information comprising at least one or more of allocation adjustment indication for the uplink data transmission; a secondary resource allocation which is reduced in comparison with the primary resource allocation.

According to an example embodiment, the apparatus further comprises means for receiving uplink data on an adjusted resource corresponding to at least a subset of one or more contiguous set of PRB groups on which the user equipment is allowed to transmit.

According to an example embodiment, the apparatus further comprises means for transmitting a second message comprising further scheduling information for sending leftover data.

According to an example embodiment, the means comprises at least one processor; and at least one memory including computer program code, the at least one memory and computer program code configured to, with the at least one processor, cause the performance of the apparatus.

According to a third aspect, there is provided a method comprising receiving, from a full-duplex network node, at least one message comprising at least primary scheduling information comprising at least a primary resource allocation for uplink data transmission, wherein a configuration related to the primary resource allocation indicates that the primary resource allocation is adjustable; sensing reservation signals on a physical resource block group basis, the sensing comprising determining one or more contiguous sets of physical resource block groups on which the apparatus is allowed to transmit; adjusting the primary resource allocation to correspond to at least a subset of the one or more contiguous sets of PRB groups to obtain an adjusted resource allocation; and transmitting, to the full-duplex network node, an adjustment indication on uplink control channel resource corresponding to the primary resource allocation, wherein the uplink control channel resource is received in the at least one message or is pre-configured.

According to an example embodiment, the method further comprises shifting front-loaded demodulation reference signals (DMRS) within the adjusted resource corresponding to the adjusted resource allocation.

According to an example embodiment, the method further comprises transmitting uplink data on the adjusted resource corresponding to the adjusted resource allocation.

According to an example embodiment, the method further comprises receiving, from the full-duplex network node, a second message comprising further scheduling information for sending leftover data.

According to a fourth aspect, there is provided a method comprising transmitting in a full-duplex mode, to a user equipment, at least one message comprising at least primary scheduling information comprising at least a primary resource allocation for uplink data transmission, wherein a configuration related to the primary resource allocation indicates to the user equipment that the primary resource allocation is adjustable; and receiving an adjustment indication on uplink control channel resource corresponding to the primary resource allocation, wherein the uplink control channel resource is transmitted in the at least one message or is pre-configured.

According to an example embodiment, the method further comprises receiving uplink data on an adjusted resource corresponding to at least a subset of one or more contiguous set of PRB groups on which the user equipment is allowed to transmit.

According to an example embodiment, the method further comprises transmitting a second message comprising further scheduling information for sending leftover data.

According to a fifth aspect, there is provided a non-transitory computer readable medium having stored thereon a set of computer readable instructions that, when executed by at least one processor, cause an apparatus to at least to perform the method according to the third aspect.

According to a sixth aspect, there is provided a non-transitory computer readable medium having stored thereon a set of computer readable instructions that, when executed by at least one processor, cause an apparatus to at least to perform the method according to the fourth aspect.

According to a seventh aspect, there is provided a computer program configured to cause a method according to at least the third aspect and the fourth aspect to be performed.

DETAILED DESCRIPTION

Figure 1:
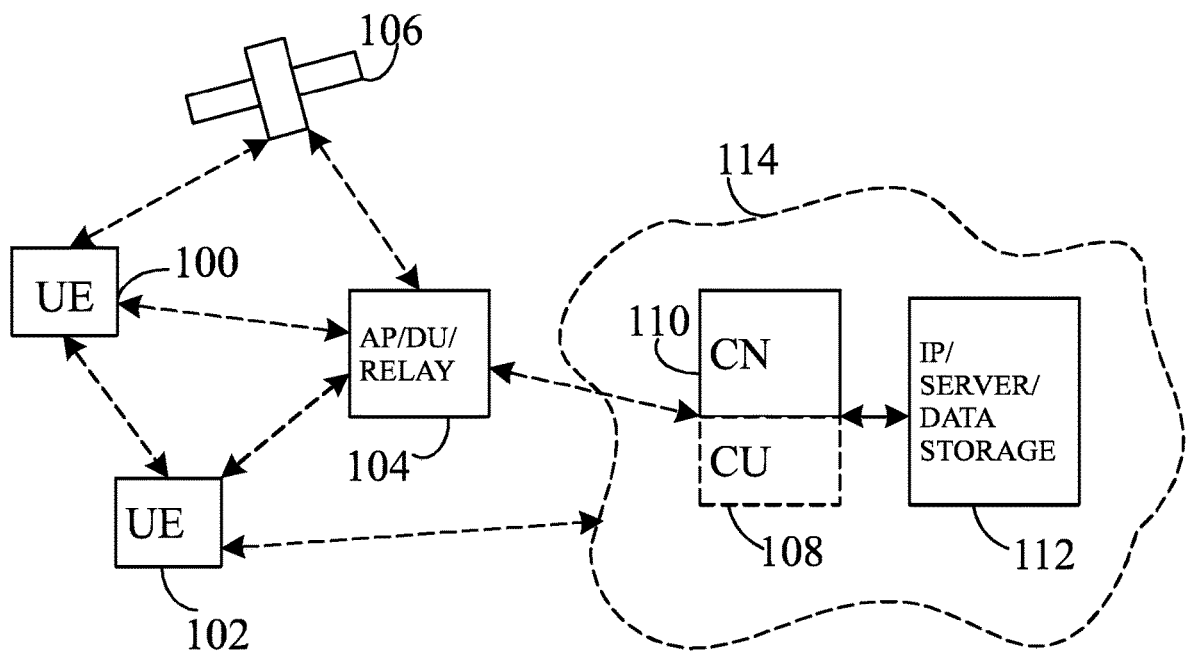
FIG. 1 shows, by way of an example, a network architecture of communication system.

FIG. 1 shows, by way of an example, a system architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The embodiments are not, however, restricted to the system given as an example but a person skilled in the art may apply the solution to other communication systems provided with necessary properties. Examples of such other communication systems include microwave links and optical fibers, for example.

The example of FIG. 1 shows a part of an exemplifying radio access network. FIG. 1 shows user devices 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the NodeB is called uplink (UL) or reverse link and the physical link from the NodeB to the user device is called downlink (DL) or forward link. It should be appreciated that NodeBs or their functionalities may be implemented by using any node, host, server or access point etc. entity suitable for such a usage. A communications system typically comprises more than one NodeB in which case the NodeBs may also be configured to communicate with one another over links, wired or wireless, designed for the purpose. These links may be used for signalling purposes. The NodeB is a computing device configured to control the radio resources of the communication system it is coupled to. The NodeB may also be referred to as a base station (BS), an access point or any other type of interfacing device including a relay station capable of operating in a wireless environment. The NodeB includes or is coupled to transceivers. From the transceivers of the NodeB, a connection is provided to an antenna unit that establishes bi-directional radio links to user devices. The antenna unit may comprise a plurality of antennas or antenna elements. The NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, also including a relay node. An example of such a relay node is a layer 3 relay (self-backhauling relay) towards a base station.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is distributed in the radio and centralized in the core network. The low latency applications and services in 5G require bringing the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements, such as Big Data and all-IP, may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of NodeBs, the user device may have an access to a plurality of radio cells and the system may comprise also other apparatuses, such as physical layer relay nodes or other network elements, etc. A cellular radio system may be implemented as a multilayer network including several kinds of cells, such as macrocells, microcells and picocells, for example. Typically, in multilayer networks, one access node provides one kind of a cell or cells, and thus a plurality of NodeBs are required to provide such a network structure.

Some devices discussed above, e.g. base station and/or UE(s) may be capable of full duplex (FD) communication, which allows communication in both directions simultaneously. FD may, for example, reduce latency in time division duplex (TDD) and/or almost double data rates by transmitting and receiving at the same time. As another example, considering high reliability requirement of ultra-reliable low latency communications (URLLC), simultaneous transmission between DL and UL may be used to minimize resource unavailability for URLLC traffic. Half duplex (HD) communication allows communication in both directions but only one direction at a time especially in case with TDD operation.

FD may be supported at the network side, e.g. by the BS. HD, may be supported by the UE without extra complexity for UE implementation for e.g. self-interference cancellation. UE may support FD, but may operate in a HD mode. A serving BS may be FD capable on at least a given carrier and may use the given carrier to serve a plurality of HD-only capable UEs and/or FD UEs operating in an HD mode. Mechanical tx (transmission) and rx (reception) antenna separation may reduce the degree of self-interference, and is easier to implement at the gNB.

Regarding simultaneous DL and UL transmission on the same resource (i.e., full duplex capability), device with full duplex capability faces an inherited strong interference that is originated from its own transmitted signal. It is called self-interference (SI) which has higher signal strength than a desired one. This strong SI may be very difficult to cancel out perfectly but the amount of self-interference can be effectively reduced since we know the characteristics of interfering signal originated from device itself. With developments at SI cancellation techniques (mechanical, analog and/or digital), consideration of FD capability, at least from gBN perspective, will become technically feasible and available.

Figure 2:
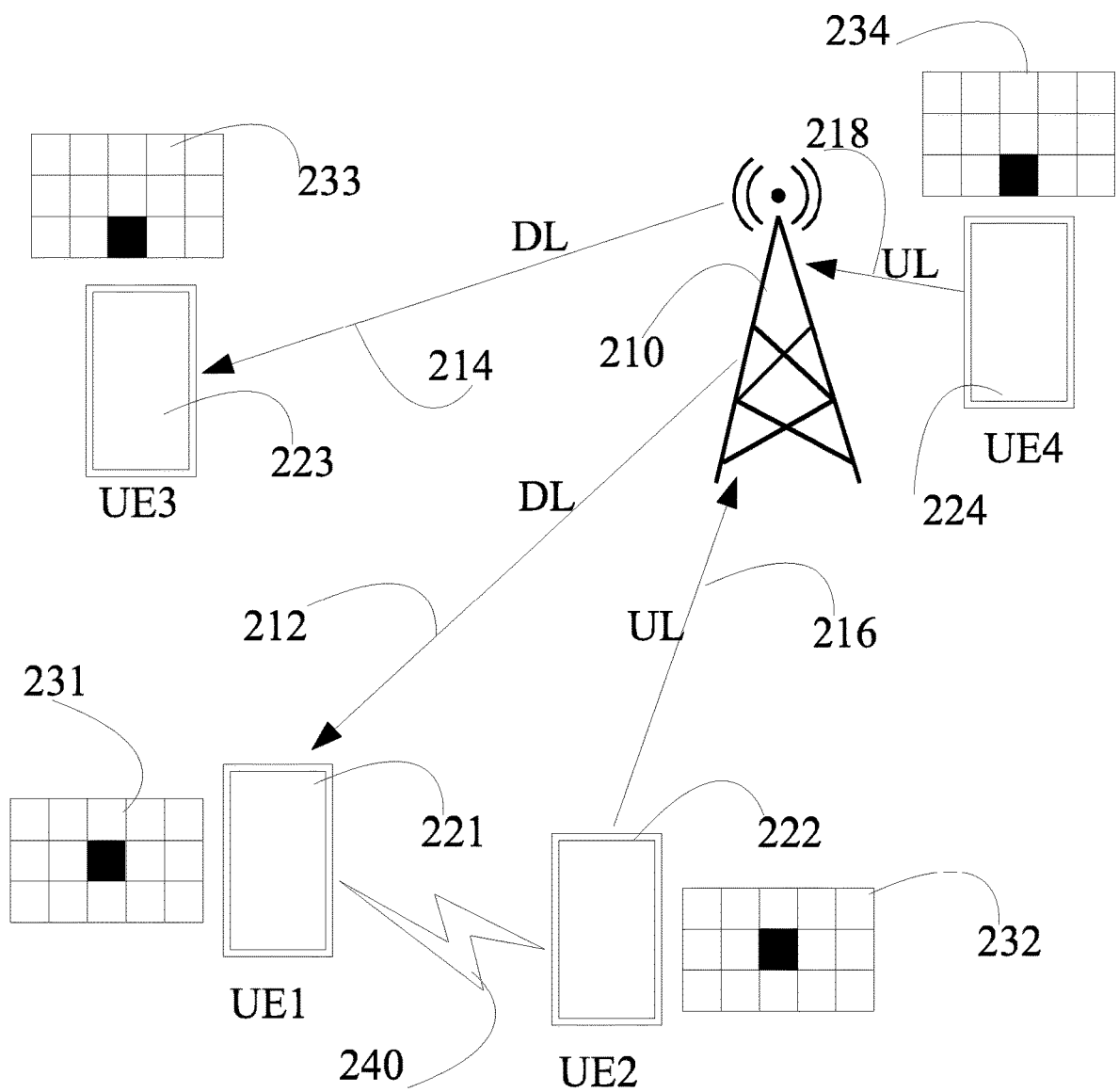
FIG. 2 s shows, by way of example, an illustration of inter-user equipment interference.

FIG. 2 shows, by way of example, an illustration of inter-user equipment interference. It may be assumed that the base station 210 is a full duplex (FD) base station (BS) having the capability on self-interference cancellation on the UL reception 216, 218 from one or more user equipments (UEs), e.g. UE2 222 and UE4 224 by cancelling the DL transmission 212, 214 to one or more user equipments, e.g. UE1 221 and UE3 223. In the UE side, even if with half duplex (HD) operation, the UE might not have self-interference from its UL transmission to its own DL reception, since DL/UL may occupy different resources in time. There may be inter-UE interference due to FD BS 210. As shown by resource blocks 231 and 232 in FIG. 2, the FD BS 210 schedules overlapping DL resources for UE1 221 and UL resources for UE2 222. UL transmission 216 of UE2 222 will interfere (shown by 240) with the DL reception 212 of UE1 221 which may cause DL reception failure for the UE1 221. This is the case especially if UE1 221 and UE2 222 are in proximity, i.e. the distance between UE1 and UE2 is short enough. As shown by resource blocks 233 and 234, FD BS 210 may schedule overlapping resources for DL reception 214 of UE3 223 and UL transmission 218 of UE4 224. However, the interference from UL transmission 218 of UE4 224 to DL reception 214 of UE3 223 may be negligible due to the large distance between UE3 and UE4, and/or low UL transmission power of UE4 224. The UL transmission power of UE4 224 may be low because of the relatively small distance between the BS 210 and the UE4 224.

Therefore, it is desirable to be able to detect and avoid potential inter-UE interference in FD systems when strong interference is identified e.g. between UE1 221 and UE2 222.

Uplink control information (UCI) may be carried by physical uplink control channel (PUCCH) or physical uplink shared channel (PUSCH). UCI comprises e.g. hybrid automatic repeat request (HARQ) feedback, channel state information (CSI) and/or scheduling request (SR). The UE reports the UCI to a network via uplink physical channel.

Downlink traffic may be scheduled e.g. with semi persistent scheduling (SPS). The scheduling may be referred to as semi-static radio resource allocation. Scheduling with SPS means that users are scheduled on the same frequency domain resources with a fixed time-domain periodicity without gNB transmitting scheduling downlink control information (DCI). For the uplink traffic, configured grant (CG) resource allocation patterns may be used in the similar way as SPS in DL. The CG may also allow the network, e.g. a 5G network, enables multiple devices to share the periodic resources.

The new radio (NR) solution for the SPS, which is used for downlink allocations, may be summarized as follows. The time-domain periodicity may be configured by Radio Resource Control (RRC) signalling. The corresponding frequency-domain allocation and starting time may be given with the Downlink Control Information (DCI) activation which may be scrambled with the Configured Scheduling-Radio Network Temporary Identifier (CS-RNTI). Fixed modulation and coding scheme (MCS) information is also indicated in DCI for the allocations until a new DCI is given.

The NR solution for the CG, which is used for uplink allocations, may be summarized as follows. In the CG Type 1, the uplink grant is provided by RRC, i.e. all is configured by RRC, such as time-frequency allocation grid, MCS, etc. In the CG Type 2, the uplink grant is provided roughly similarly as in the SPS.

Downlink Control Information (DCI) is carried by physical downlink control channel (PDCCH). Downlink Control Information (DCI) carries information on uplink (UL)/downlink (DL) resource allocation to the UE in UL grant scheduling PUSCH and DL assignment scheduling PDSCH, respectively. Upon reception of PDSCH, the UE may generate HARQ-ACK/NACK or HARQ feedback based on the outcome of PDSCH reception, e.g. based on the outcome of DL data decoding. The UE may report acknowledgement as HARQ-ACK if the DL data decoding has been successful and negative acknowledgement (NACK) if the DL data decoding has failed. Timing between DL data transmission and corresponding HARQ-ACK transmission is indicated by a field, K1 or a slot timing value, in the DCI.

Transmission of UCI along with PUSCH is considered feasible. Autonomous UL transmission on unlicensed spectrum (secondary cells (SCells) in Licensed Assisted Access (LAA)) is supported with following key characteristics: in Autonomous UL Access (AUL), a UE may be RRC configured with a set of subframes and HARQ processes that it may use for autonomous PUSCH transmission. AUL operation may be activated and released e.g. with DCI format 01 or 4A. In case there is no data in UL buffers, the UE may skip an AUL allocation. Physical resource block (PRB) allocation, modulation and coding scheme (MCS) and demodulation reference signals (DMRS) cyclic shift and orthogonal cover code may be indicated to the UE with AUL activation DCI. The UE may indicate the selected HARQ process ID, new data indicator (NDI), redundancy version (RV), UE ID and PUSCH starting and ending points to the network node, e.g. eNodeB, along with each UL transmission. In addition, the UE may indicate whether the UE-acquired channel occupancy time (COT) may be shared with the network node, e.g. eNodeB. The network node, e.g. eNodeB, may provide HARQ feedback for AUL-enabled HARQ processes to the UE. In addition, the network node may transmit power command, and transmit precoding matrix indicator (PMI) via DL control signalling message called AUL-downlink feedback information, i.e. AUL-DFI.

AUL allows for configuring a set of starting positions for UEs with a very fine raster within the first single carrier frequency division multiple access (SC-FDMA) symbol of a subframe: 16, 25, 34, 43, 52, or 61 microseconds after the subframe boundary, or at the beginning of symbol #1. Since the UEs perform listen-before-talk operation prior to the AUL transmission to determine whether the channel is free, different starting points allow for e.g. prioritizing transmissions for certain UEs and reducing the number of collisions. Prioritizing transmission may be performed e.g. by assigning an earlier starting point for transmissions of UEs with high priority. The transmission within the first symbol #1 is not PUSCH data but instead a very long cyclic prefix (CP) extended from the next symbol #2. The CP extension may be used for reserving the channel for the given UE by blocking other UEs.

In unlicensed spectrum (NR-U) it may apply for configured grants (CG) that both Type 1 and Type 2 CG are supported. Further, it may apply for configured grant procedures that Dependencies of HARQ process information to the timing may be removed, e.g. by introducing UCI on PUSCH to carry HARQ process ID, new data indicator (NDI) and redundancy version ID (RVID). Then, UE may select the HARQ process ID from an RRC configured set of HARQ IDs.

UCI may, in addition to HARQ feedback, CSI and/or SR, comprise e.g. HARQ ID, NDI and RVID. In addition, UCI may comprise channel occupancy time (COT) sharing information, UE ID, etc. The content of UCI may be further defined based on future studies.

Downlink Feedback Information (DFI) may be introduced. DFI may include pending HARQ feedback.

Time domain resource allocation may be more flexible, since e.g. bitmap based approach may be used, or time domain resource allocation approach, e.g. based on NR Rel-15, which includes {periodicity, offset in the frame, start symbol and length of PUSCH and K-repetition signalling}, or additional aspects such as finer granularity of resource allocation, and multiple resources within a period may be considered for enhancing flexibility on time domain resource allocation.

Retransmissions without explicit UL grant may be supported, also on CG resources.

In absence of feedback, UE might not assume ACK, but rather NACK, based on some timer. For example, if there is no feedback during a pre-defined time period, NACK may be assumed.

Consecutive CG resources in time may be allowed without any gaps in between the resources. Non-consecutive CG resources, which are not necessarily periodic, may be allowed with gaps in between the resources.

Multiple pseudo-random starting positions may be introduced with sub-symbol granularity to manage collisions between users. User with later starting point will detect an earlier user when performing listen-before-talk (LBT) operation, and omit its transmission.

For configured grant time domain resource allocation, the mechanisms in Rel-15 (both Type 1 and Type 2) may be extended so that the number of allocated slots following the time instance corresponding to the indicated offset can be configured.

There is provided a mechanism for inter-UE interference avoidance, wherein the UE may adjust granted UL transmission by the network node, e.g. gNB, in FD operation.

An example apparatus capable of performing a method disclosed herein is described first, and then the method will be described.

Figure 3:
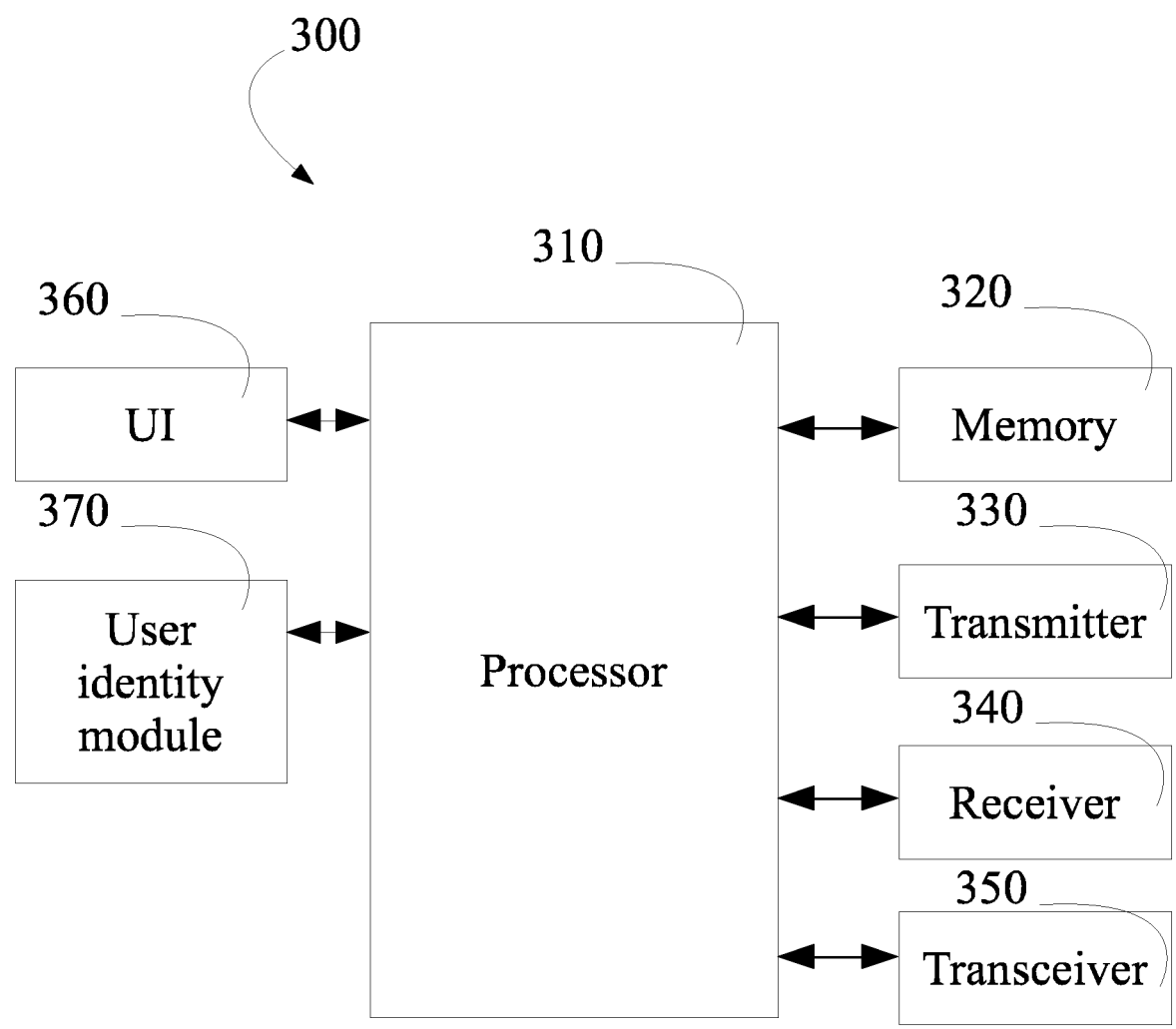
FIG. 3 shows, by way of an example, a block diagram of an apparatus.

FIG. 3 shows, by way of an example, a block diagram of an apparatus 300. Illustrated is an apparatus or device 300, which may comprise, for example, a network node, or a mobile communication device such as a user device or user equipment UE. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions, e.g. the method(s) as disclosed herein.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with a mobile communication system standards, such as 5G, long term evolution, LTE, wireless local area network, WLAN and/or Ethernet.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected.

Figure 4:
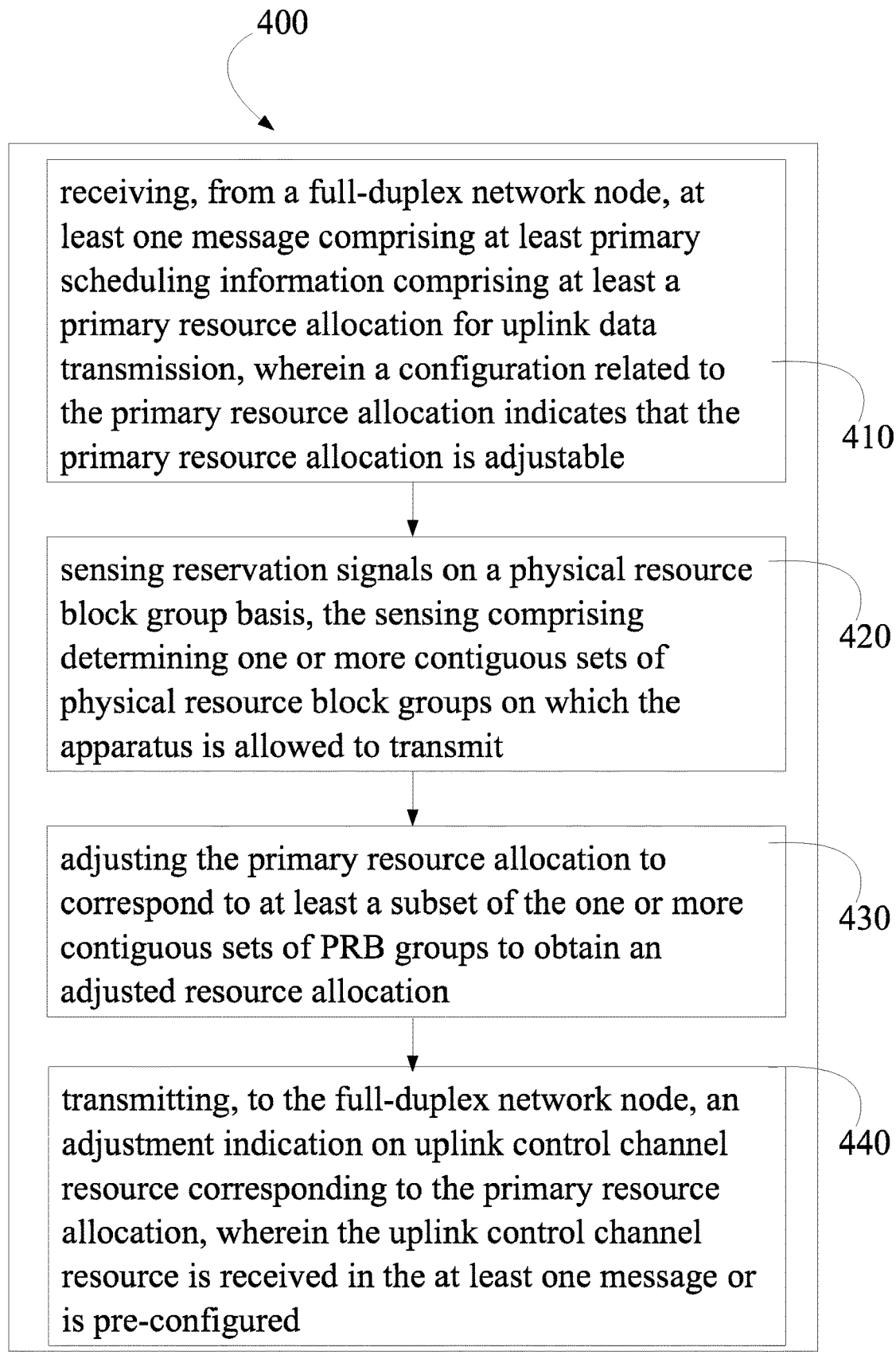
FIG. 4 is a flow graph of a method for adjusting resource allocation.

FIG. 4 is a flow graph of a method 400 for adjusting resource allocation. The phases of the illustrated method may be performed in a UE, or in a control device configured to control the functioning thereof, when installed therein. The method 400 comprises receiving 410, from a full-duplex network node, at least one message comprising at least primary scheduling information comprising at least a primary resource allocation for uplink data transmission, wherein a configuration related to the primary resource allocation indicates that the primary resource allocation is adjustable. The method 400 comprises sensing 420 reservation signals on a physical resource block group basis, the sensing comprising determining one or more contiguous sets of physical resource block groups on which the apparatus is allowed to transmit. The method 400 comprises adjusting 430 the primary resource allocation to correspond to at least a subset of the one or more contiguous sets of PRB groups to obtain an adjusted resource allocation. The method 400 comprises transmitting 440, to the full-duplex network node, an adjustment indication on uplink control channel resource corresponding to the primary resource allocation, wherein the uplink control channel resource is received in the at least one message or is pre-configured.

The method disclosed herein improves spectral efficiency of opportunistic PUSCH. Especially in case a very minor portion of the granted resource is overlapping between DL allocation of a UE and UL allocation of another UE (such as 5 RBs of 50 RB allocated to each), the spectral efficiency is significantly improved. The method disclosed herein enables avoidance of inter-UE interference.

Figure 5:
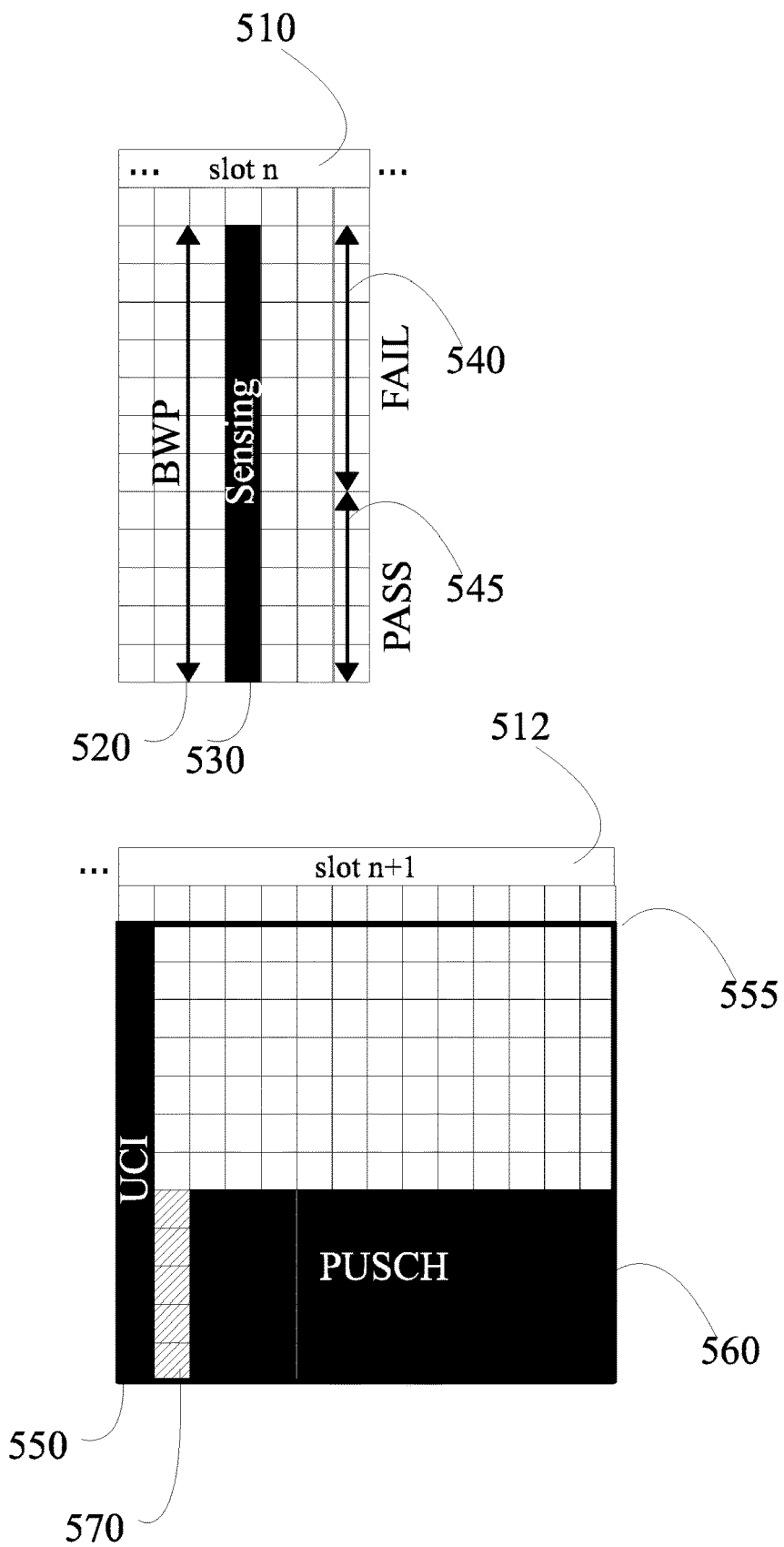
FIG. 5 shows an example of scheduling.

FIG. 5 shows an example of scheduling. Time is divided into slots, e.g. slot n 510 and slot n+1 512. A UE may be configured by the network node, e.g. a FD network node, e.g. BS, whether PUSCH allocation may be adjusted or not. The configuration may be via higher layer signalling e.g. RRC signalling or via physical layer signalling. In case of physical layer signalling, the configuration may be per PUSCH allocation specific. Alternatively, PUSCH allocation adjustment rule may be configured to the UE based on its capability. The rule may indicate whether PUSCH allocation may be adjusted or not and/or the condition/status that PUSCH allocation may be adjusted.

A UE may receive an indication that resource allocation may be adjusted. A UE receives a message comprising an UL grant for an opportunistic PUSCH frequency resource spanning entire bandwidth part (BWP) as shown by arrow 520. The UE is indicated in the UL grant with primary scheduling information or parameters. The primary scheduling parameters comprises at least a primary resource allocation for uplink shared channels, i.e. uplink data transmission. The primary scheduling information may comprise modulation coding scheme to be used in case the primary resource allocation is adjusted. UE may receive also associated PUCCH resource corresponding to the primary resource allocation. Alternatively, the PUCCH resource may be pre-configured. The PUCCH resource may be indicated/preconfigured relative to PUSCH allocation. For example, PUCCH resource location can start P PRBs from the first allocated PUSCH PRB and S symbols from the first PUSCH symbol. P and S are integers.

UE performs sensing 530 of reservation signal on entire allocation with sub-band granularity at a pre-determined symbol(s) before the scheduled PUSCH. There may be a time delay between sensing and scheduled resource that may need to fulfil the minimum processing requirements of PUCCH and PUSCH as specified in the 3GPP specification TS38.214.

When the UE performs sensing or detection of reservation signal per PRB group, special sequence of reservation signal may be needed per PRB group, or one could use wideband sequence and perform sensing or detection decisions per PRB group. For example, UE may be configured by default to perform sensing or detection if serving gNB supports FD. As another example, UE may be configured/indicated by gNB whether sensing or detection is performed or not for particular PUSCH.

The UE may be indicated in the UL grant, in addition to the primary scheduling parameters, with secondary scheduling parameters. The secondary scheduling information or parameters may comprise e.g. at least an uplink shared channel allocation adjustment indication, and/or at least a secondary resource allocation which is reduced in comparison with the granted primary resource allocation. The secondary scheduling information may be indicated as adjustment rule(s) that can be used to derive the secondary scheduling parameters from the primary scheduling parameters. For instance, an adjustment rule can be that the secondary allocation occupies x % of allocated resource allocated by the primary allocation, wherein x is the configured parameters of the adjustment rule.

The secondary scheduling information may be received via physical layer signalling, i.e. L1 signalling, e.g. DCI or higher layer signalling such as RRC signalling or MAC control element or any combination of the different layer signalling. In case of using physical layer signalling for dynamic scheduling information, the secondary scheduling information may be indicated explicitly in the similar format as the primary scheduling parameters using e.g. downlink control information (DCI) in physical downlink control channel (PDCCH). Or the secondary scheduling information may comprise the adjustment rule which may be configured via RRC signalling or MAC control element to allow the UE to derive the secondary scheduling parameters from the primary scheduling parameters.

The sensing comprises determining a contiguous set, e.g. the largest contiguous set, of physical resource block (PRB) groups on which the apparatus is allowed to transmit. A portion of all the PRB groups corresponds to a sub-band. A sub-band is smaller than the entire BWP. Determination of whether the sub-band may be used for transmission may be based on a priority level of uplink scheduling assignment of the UE. The priority levels, e.g. UE specific priority levels, may be pre-determined. Alternatively or in addition, the determination may be based on an energy threshold of a signal transmitted by another device to which the UE sends reservation signal(s). For example, the another device may be one or more UEs with DL assignment indicating sending of reservation signals.

The UE detects reservation signal and may decide that a sub-band may not be used for transmission. That sub-band may be marked as FAIL, as the sub-band indicated by an arrow 540. Otherwise a sub-band may be marked as PASS, as the sub-band indicated by an arrow 545. The UE may adjust the primary resource allocation to correspond to at least a subset of the determined contiguous set of PRB groups. Thus, the adjusted resource allocation may correspond to the determined contiguous set of PRB groups, or may be smaller than the determined contiguous set of PRB groups on which the apparatus is allowed to transmit. The UE may decide to transmit on a bandwidth smaller than allowed.

A UE starts transmission of UCI on the PUCCH 550 resource configured for the purpose of the PUSCH. Time and frequency location of such PUCCH resource may be relative to the frequency resource allocation of the PUSCH. For example, PUCCH resource location can start P PRBs from the first allocated PUSCH PRB and S symbols from the first PUSCH symbol. P and S are integers. The granted PUSCH 555 is shown by a thicker rectangular in FIG. 5. A UE does not perform adjustment of the PUCCH allocation and PUCCH content size based on the outcome of sensing. For example, PUCCH payload size may be kept constant but the content, e.g. value of some parameter, may be updated based on the sensing outcome. PUCCH allocation stays the same, since otherwise gNB would not be able to receive the UCI carried by the PUCCH. The gNB must know the content size (payload size) a priori. However, the UE may modify the content of the PUCCH, e.g. in order to signal an adjustment indication. This signalling or the adjustment indication may indicate the adjusted resource allocation corresponding to at least a subset of the determined contiguous set of PRB groups. The adjustment indication may be, for example, in the form of start-length resource allocation (RA) type (for contiguous transmission) indicating modified resource allocation by UE with sensing sub-band granularity.

As another example, the adjustment indication may be a one-bit indication to indicate whether the resource allocation is adjusted or not.

As a further example, the adjustment indication may indicate that the secondary scheduling information, which may have been received in addition to the primary scheduling information, is selected. For example, it may be that all sub-bands of the secondary allocation and secondary scheduling parameters are PASS while at least one sub-band of the primary allocation is FAIL. Then, the UE may select to transmit according to the secondary scheduling parameters.

In case all sub-bands of the primary allocation are PASS, PUSCH frequency allocation is not modified or adjusted, and PUCCH transmission may be avoided. If PUCCH is not transmitted, the coded PUSCH may be allocated also to resource of indicated PUCCH. In this case, there may be one indicator transmission to BS to inform BS that the PUCCH resource is occupied by the PUSCH, for example.

As an example, the UE may omit the transmission of the adjustment indication. For example, the gNB may be capable of blind detection of the adjusted PUSCH. This may be possible e.g. with small cells in which there is a small number of UEs active, and there might not be so many PUSCH adjustment possibilities which makes blind detection easier. If the gNB is capable of blind detection, and knows which resources it schedules to which UEs, it may know potential overlaps and the adjustment possibilities. Then, UE may transmit uplink data on the adjusted resource without transmitting an adjustment indication.

In case the UE has adjusted the resource allocation, the UE transmits PUSCH 560 on the adjusted resource after or along with PUCCH. The PUSCH may be rate-matched to the adjusted allocation. In other words, the adjusting of the primary resource allocation may comprise rate-matching transport block (TB) prepared based on the primary resource allocation to the adjusted resource allocation. In addition, transmission power may be adjusted. For example, the transmission power may be increased, since with less PRBs UE may transmit with increased power without hitting maximum effective radiated power limit. The BS may configure such power change beforehand. PUSCH demodulation reference signals (DMRS) 570 may be shifted within the adjusted resource allocation to not collide with PUCCH resource at the beginning of the slot. Based on configuration of PUCCH resource, UE may determine the position of PDSCH DMRS. For example, the PUSCH DMRS 570 may be shifted e.g. by one symbol as in FIG. 5 so that it does not collide with PUCCH 550 resource. In case the available PUSCH allocation is reduced significantly compared to the primary resource allocation, a UE may reduce also the modulation and coding scheme (MCS). The UE may inform the network node, e.g. gNB, about reduced MCS in the UCI carried by the PUCCH 550. For example, reduction of approximately 50% or more may be considered as significant reduction, which means that the effective coding rate is at least doubled.

In case there is sufficient processing time for the UL UE to generate a new transport block (TB) based on the sensing outcome, a new TB may be prepared based on the adjusted resource allocation, or based on at least the available PUSCH resource. Also a new buffer status report (BSR) may be prepared and piggybacked on the PUSCH. The MCS may be kept the same as the original MCS information carried by DCI. Thus, the adjusting the primary resource allocation may comprise preparing a new transport block and a buffer status report based on the adjusted resource allocation.

Due to the reduced size of the available PUSCH resource and keeping the same MCS as originally planned, there will be some leftover data in the buffer. Therefore, UE may piggyback the latest BSR information in PUSCH transmission. This way the UE may inform the gNB about how much data it still has to send due to reduction of resources. The network node, e.g. gNB, may send an updated grant for sending the remained data packet and possible retransmission. The UE may receive, from the full-duplex network node, a second message comprising further scheduling information for sending leftover data.

Figure 6:
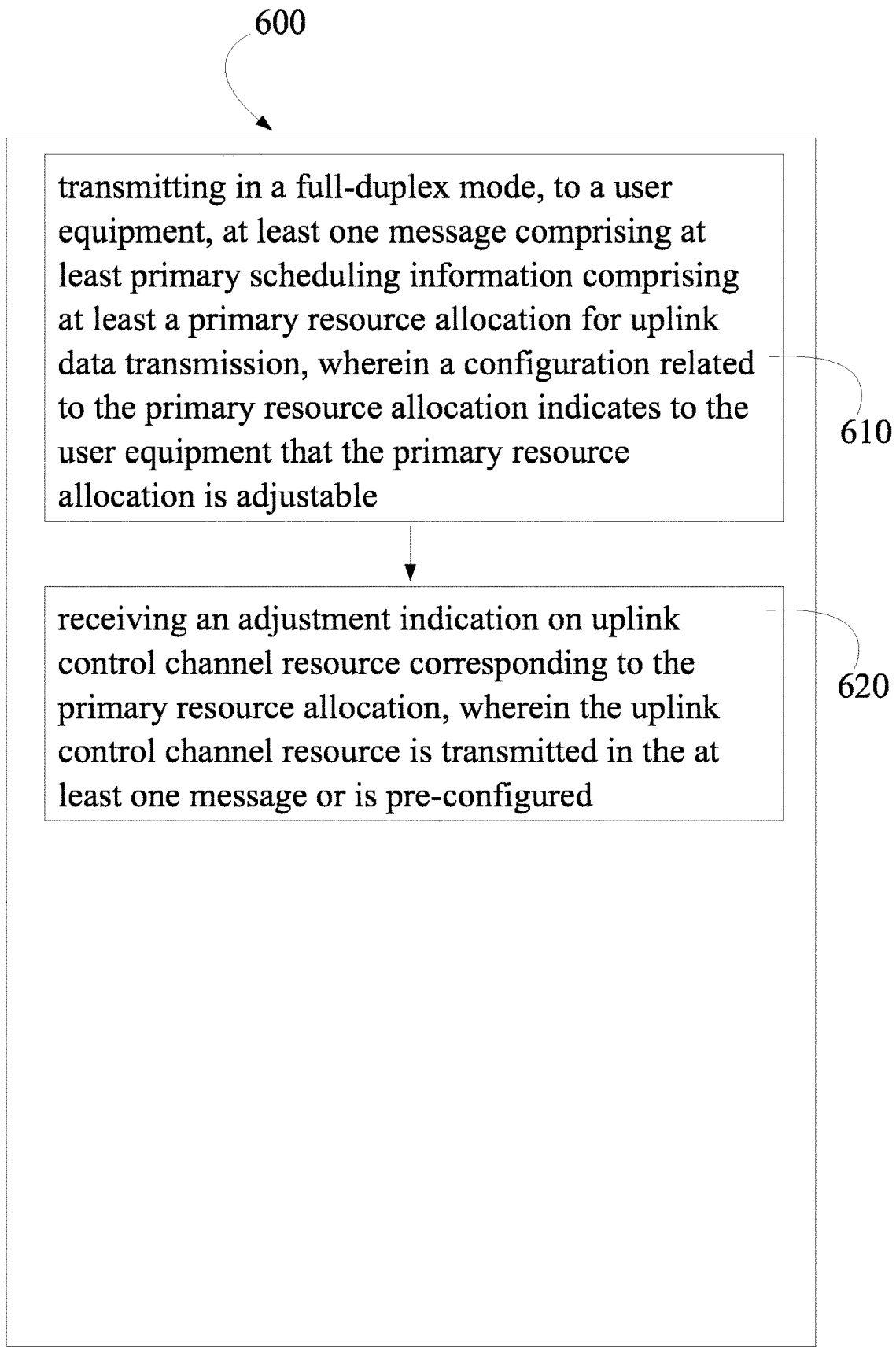
FIG. 6 is a flow graph of a method for adjusting resource allocation.

FIG. 6 shows, by way of an example, a flow graph of a method for adjusting resource allocation. The phases of the illustrated method may be performed in a network node, e.g. gNB, or in a control device configured to control the functioning thereof, when installed therein. The method 600 comprises transmitting 610 in a full-duplex mode, to a user equipment, at least one message comprising at least primary scheduling information comprising at least a primary resource allocation for uplink data transmission, wherein a configuration related to the primary resource allocation indicates to the user equipment that the primary resource allocation is adjustable. The method 600 comprises receiving 620 an adjustment indication on uplink control channel resource corresponding to the primary resource allocation, wherein the uplink control channel resource is transmitted in the at least one message or is pre-configured.

The invention claimed is:
1. An apparatus comprising:
   at least one processor; and
   at least one memory including computer program code;
   the at least one memory and the computer program code configured to, with the at least one processor, cause the apparatus at least to:
   receive, from a full-duplex network node, at least one message comprising at least primary scheduling information comprising at least a primary resource allocation for uplink data transmission, wherein a configuration related to the primary resource allocation indicates that the primary resource allocation is adjustable;
   sense reservation signals on a physical resource block group basis, wherein the at least one processor and the computer program code configured to cause the apparatus to sense comprises the at least one processor and the computer program code configured to cause the apparatus to determine one or more contiguous sets of physical resource block groups on which the apparatus is allowed to transmit;
   adjust the primary resource allocation to correspond to at least a subset of the one or more contiguous sets of PRB groups to obtain an adjusted resource allocation; and
   transmit, to the full-duplex network node, an adjustment indication on uplink control channel resource corre- sponding to the primary resource allocation, wherein the uplink control channel resource is received in the at least one message or is pre-configured.

2. The apparatus of claim 1, wherein the configuration comprises at least one or more of:
a one bit indication to indicate whether the primary resource allocation is adjustable or not;
a secondary scheduling information comprising at least one or more of:
allocation adjustment indication for the uplink data transmission; or
a secondary resource allocation which is reduced in comparison with the primary resource allocation.

3. The apparatus of claim 1, wherein the at least one processor and the computer program code configured to cause the apparatus to determine one or more contiguous sets of physical resource block groups comprises the at least one processor and the computer program code configured to cause the apparatus to determine one or more contiguous sets of physical resource block groups on which the apparatus is allowed to transmit, based on a priority level of uplink scheduling assignment of the apparatus and/or based on an energy threshold of a signal transmitted by another device.

4. The apparatus of claim 1, wherein the adjustment indication comprises at least one of:
a one-bit indication to indicate whether the primary resource allocation is adjusted or not;
an indication of selection of secondary scheduling information, wherein the secondary scheduling information has been received and comprises at least a secondary resource allocation which is reduced in comparison with the primary resource allocation; or
an indication of the adjusted resource allocation corresponding to at least the subset of the one or more contiguous set of PRB groups.

5. The apparatus of claim 1, wherein the primary scheduling information further comprises modulation coding scheme to be used in case the primary resource allocation is adjusted.

6. The apparatus of claim 1, wherein the at least one processor and the computer program code are further configured to cause the apparatus to:
shift front-loaded demodulation reference signals (DMRS) within the adjusted resource corresponding to the adjusted resource allocation.

7. The apparatus of claim 1, wherein the at least one processor and the computer program code are further configured to cause the apparatus to:
transmit uplink data on the adjusted resource corresponding to the adjusted resource allocation.

8. A method comprising:
receiving, from a full-duplex network node, at least one message comprising at least primary scheduling information comprising at least a primary resource allocation for uplink data transmission, wherein a configuration related to the primary resource allocation indicates that the primary resource allocation is adjustable;
sensing reservation signals on a physical resource block group basis, the sensing comprising determining one or more contiguous sets of physical resource block groups on which the apparatus is allowed to transmit;
adjusting the primary resource allocation to correspond to at least a subset of the one or more contiguous sets of PRB groups to obtain an adjusted resource allocation; and
transmitting, to the full-duplex network node, an adjustment indication on uplink control channel resource corresponding to the primary resource allocation, wherein the uplink control channel resource is received in the at least one message or is pre-configured.

9. The method of claim 8, wherein the configuration comprises at least one or more of:
a one bit indication to indicate whether the primary resource allocation is adjustable or not; or
a secondary scheduling information comprising at least one or more of:
an allocation adjustment indication for the uplink data transmission;
a secondary resource allocation which is reduced in comparison with the primary resource allocation.

10. The method of claim 8, wherein the determining the one or more contiguous set of physical resource block groups on which the apparatus is allowed to transmit is performed based on a priority level of uplink scheduling assignment of the apparatus and/or based on an energy threshold of a signal transmitted by another device.

11. Method of claim 8, wherein the adjustment indication comprises at least one or more of:
a one-bit indication to indicate whether the primary resource allocation is adjusted or not;
an indication of selection of secondary scheduling information, wherein the secondary scheduling information has been received and comprises at least a secondary resource allocation which is reduced in comparison with the primary resource allocation; or
an indication of the adjusted resource allocation corresponding to at least the subset of the one or more contiguous set of PRB groups.

12. The method of claim 8, wherein the primary scheduling information further comprises modulation coding scheme to be used in case the primary resource allocation is adjusted.

13. The method of claim 8, further comprising:
shifting front-loaded demodulation reference signals (DMRS) within the adjusted resource corresponding to the adjusted resource allocation.

14. The method of claim 8, further comprising:
transmitting uplink data on the adjusted resource corresponding to the adjusted resource allocation.

15. An apparatus comprising:
at least one processor; and
at least one memory including computer program code;
the at least one memory and the computer program code configured to, with the at least one processor, cause the apparatus at least to:
transmit in a full-duplex mode, to a user equipment, at least one message comprising at least primary scheduling information comprising at least a primary resource allocation for uplink data transmission, wherein a configuration related to the primary resource allocation indicates to the user equipment that the primary resource allocation is adjustable; and
receive an adjustment indication on uplink control channel resource corresponding to the primary resource allocation, wherein the uplink control channel resource is transmitted in the at least one message or is pre-configured.

16. The apparatus of claim 15, wherein the configuration comprises at least one or more of:
a one bit indication to indicate whether the primary resource allocation is adjustable or not; or a secondary scheduling information comprising at least one or more of:
an allocation adjustment indication for the uplink data transmission; or
a secondary resource allocation which is reduced in comparison with the primary resource allocation.

17. The apparatus of claim 15, wherein the at least one processor and the computer program code are further configured to cause the apparatus to:
receive uplink data on an adjusted resource corresponding to at least a subset of one or more contiguous set of PRB groups on which the user equipment is allowed to transmit.

18. A method, comprising:
transmitting in a full-duplex mode, to a user equipment, at least one message comprising at least primary scheduling information comprising at least a primary resource allocation for uplink data transmission, wherein a configuration related to the primary resource allocation indicates to the user equipment that the primary resource allocation is adjustable; and
receiving an adjustment indication on uplink control channel resource corresponding to the primary resource allocation, wherein the uplink control channel resource is transmitted in the at least one message or is pre-configured.

19. The method of claim 18, wherein the configuration comprises at least one or more of:
a one bit indication to indicate whether the primary resource allocation is adjustable or not; or
a secondary scheduling information comprising at least one or more of:
an allocation adjustment indication for the uplink data transmission; or
a secondary resource allocation which is reduced in comparison with the primary resource allocation.

20. The method of claim 18, further comprising:
receiving uplink data on an adjusted resource corresponding to at least a subset of one or more contiguous set of PRB groups on which the user equipment is allowed to transmit.

* * * * *